United States Patent
Deyanov et al.

(10) Patent No.: US 8,376,130 B2
(45) Date of Patent: Feb. 19, 2013

(54) DIRECT DRIVE MODULAR BELT CONVEYOR, CARTRIDGE, AND QUICK CONNECT-DISCONNECT CONSTANT VELOCITY DRIVE SHAFT, FOR HIGH SPEED FOUP TRANSPORT

(75) Inventors: Roumen Deyanov, Fremont, CA (US); Michel Pharand, Los Gatos, CA (US); Michael Krolak, Los Gatos, CA (US); Theodore W. Rogers, Alameda, CA (US)

(73) Assignee: Muratec Automation Co., Ltd., Kyoto (JP)

( * ) Notice: Subject to any disclaimer, the term of this patent is extended or adjusted under 35 U.S.C. 154(b) by 0 days.

(21) Appl. No.: 12/420,529

(22) Filed: Apr. 8, 2009

(65) Prior Publication Data

US 2010/0219050 A1 Sep. 2, 2010
US 2012/0267219 A9 Oct. 25, 2012

Related U.S. Application Data

(63) Continuation-in-part of application No. 11/484,218, filed on Jul. 10, 2006, now Pat. No. 7,472,788.

(60) Provisional application No. 61/043,382, filed on Apr. 8, 2008.

(51) Int. Cl.
*B65G 15/60* (2006.01)

(52) U.S. Cl. .......................... 198/842; 198/817; 198/846

(58) Field of Classification Search ............. 198/781.03, 198/781.02, 781.04
See application file for complete search history.

(56) References Cited

U.S. PATENT DOCUMENTS

| | | | |
|---|---|---|---|
| 4,823,940 A | 4/1989 | Cretser | |
| 5,164,241 A | 11/1992 | Andre De La Porte et al. | |
| 5,259,495 A | 11/1993 | Douglas | |
| 5,348,033 A | 9/1994 | Levit | |
| 5,720,635 A * | 2/1998 | Roos | 440/38 |
| 6,032,788 A | 3/2000 | Smithers et al. | |
| 6,223,886 B1 | 5/2001 | Bonora et al. | |
| 6,308,818 B1 | 10/2001 | Bonora et al. | |
| 6,422,378 B1 * | 7/2002 | Allgaier | 198/781.03 |
| 6,468,021 B1 | 10/2002 | Bonora et al. | |
| 6,494,308 B2 | 12/2002 | Bonora et al. | |
| 6,533,101 B2 | 3/2003 | Bonora et al. | |
| 6,853,876 B2 | 2/2005 | Wehrung et al. | |
| 7,427,788 B2 * | 9/2008 | Li et al. | 257/287 |
| 7,472,788 B2 * | 1/2009 | Bonora et al. | 198/817 |
| 2004/0238332 A1 | 12/2004 | Brixius et al. | |
| 2006/0137833 A1 * | 6/2006 | Nichols et al. | 160/120 |

FOREIGN PATENT DOCUMENTS

| | | |
|---|---|---|
| DE | 100 32 188 A1 | 1/2002 |
| EP | 0 449 706 A1 | 10/1991 |
| EP | 0 939 041 A1 | 9/1999 |

OTHER PUBLICATIONS

International Search Report from International Application No. PCT/US2006/026978, (4 pages).
Office Actions, Replies, appeals, interview from U.S. Pat. No. 7,472,788.

* cited by examiner

*Primary Examiner* — Kavel Singh
(74) *Attorney, Agent, or Firm* — Fish & Richardson P.C.

(57) ABSTRACT

A conveyor system includes a cartridge, which defines a section of the conveyor. In one embodiment, the cartridge includes a number of wheels, which are designed as a unit for a conveyor section and the wheels of the cartridge are designed to hold a belt. A conveyor section, in one optional embodiment, includes integrated sensors for detecting the presence of a container (e.g., FOUP), and each conveyor section can implement precision sheet metal rails that facilitate high speed FOUP transport. In one embodiment, each conveyor section has two sides. Each side has a cartridge that has a belt. In particular embodiments, one side of the conveyor section includes a drive motor, that drives the conveyor.

19 Claims, 20 Drawing Sheets

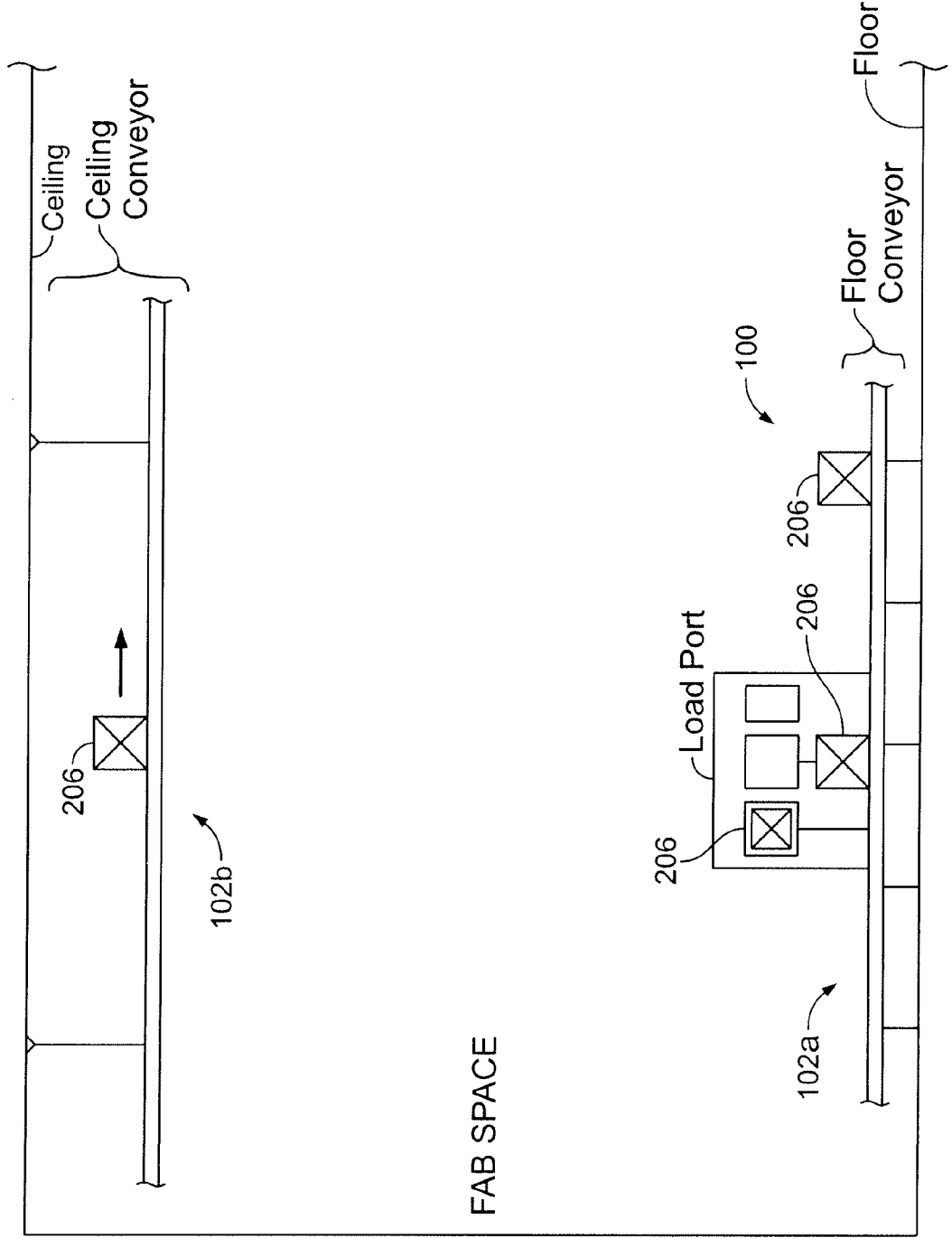

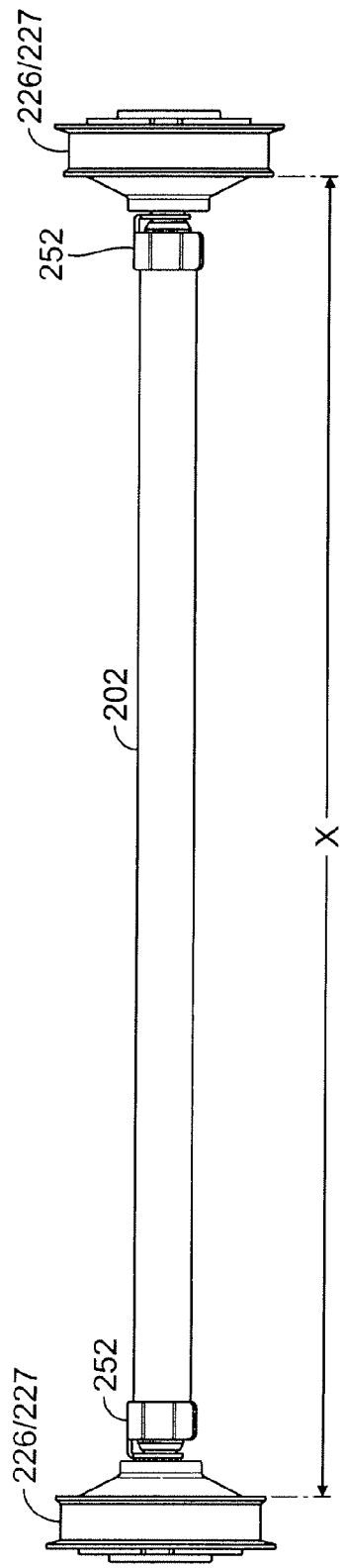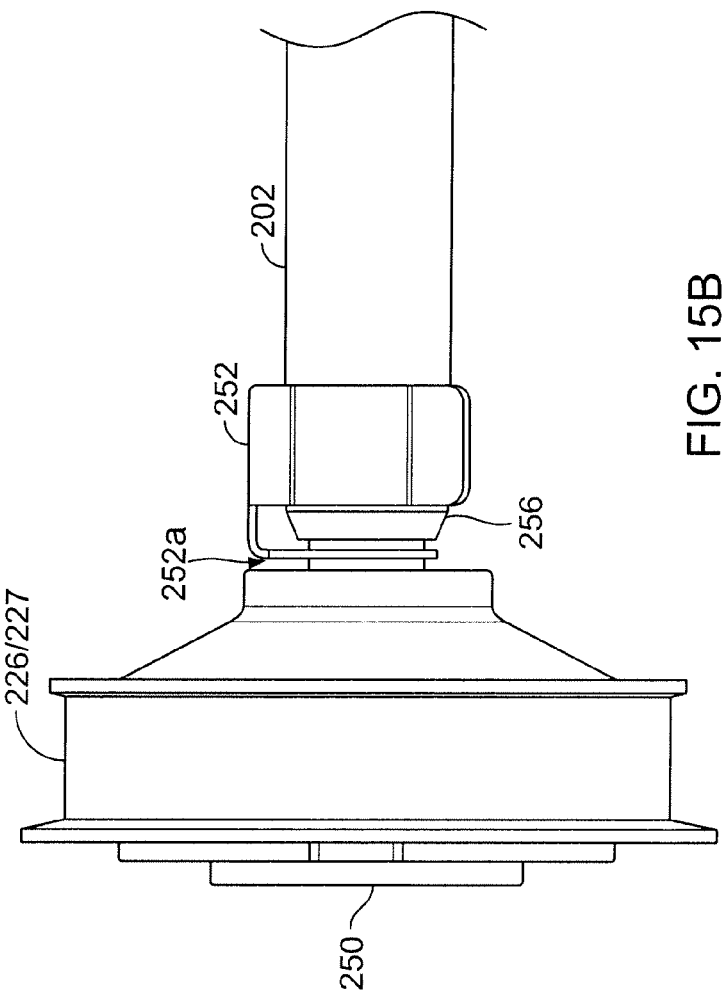
FIG. 15A
FIG. 15B

DIRECT DRIVE MODULAR BELT CONVEYOR, CARTRIDGE, AND QUICK CONNECT-DISCONNECT CONSTANT VELOCITY DRIVE SHAFT, FOR HIGH SPEED FOUP TRANSPORT

CLAIM OF PRIORITY

The present application claims priority under 35 U.S.C. §119(e) from U.S. Provisional Patent Application No. 61/043,382 filed Apr. 8, 2008, and is also a continuation-in-part and claims priority under 35 U.S.C. 120 to U.S. application Ser. No. 11/484,218, filed Jul. 10, 2006, now U.S. Pat. No. 7,472,788 both of which are incorporated in their entirety by reference herein for all purposes.

BACKGROUND

There are several ways that semiconductor wafer containers are transported in a semiconductor fabrication facility ("fab"). A system for transporting a container is often referred to as an Automated Material Transport System ("AMHS") or simply as a material transport system. A material transport system may refer to a part or all of the overall system. A fab may use only One type of AMHS throughout the fab, or there may be different types of AMHS in certain areas, or different types of AMHS for different transportation functions. Some of these AMHS types use vehicles to hold the container as it is being transported, such as a rail guided vehicle (RGV) or an automated guided vehicle (AGV). Material transport systems utilizing RGVs or AGVs require managing empty vehicles to arrange their arrival at sites where containers are to be picked up. Waiting for the arrival of such vehicles causes AMHS delays and the management of the vehicle movement increases the complexity of the AMHS. The same issues exist when moving containers with an Overhead Hoist Transport (OHT) system.

Conveyor systems are more efficient at moving containers within a fab without any, or a minimum number of, vehicle delays, and do not have to manage empty vehicles. Conveyors directly move the containers without any material or mechanical interface that comes between the conveyor surfaces and the container surfaces. Unless the conveyor is full, it is capable of immediately receiving a container for transport. For these, and other, reasons, conveyors may provide a very high throughput AMHS.

One example of a conveyor system is disclosed in U.S. Pat. No. 6,223,886, entitled "Integrated Roller Transport Pod and Asynchronous Conveyor," which is owned by Asyst Technologies, Inc., and is incorporated in its entirety herein. The drive rail 12 includes a drive system, generally designated at 38 in FIG. 1A, for propelling a container 2 along the rails 12. The drive system 38 includes a plurality of separate drive assemblies 40. Each drive assembly 40 includes a plurality of drive wheels 42 which frictionally engage the underside of the container 2 to propel the container 2 along the drive rail 12 for a specific zone Z. As shown in FIG. 1A, the drive assemblies 40 are located along the rail such that the separation between the outermost drive wheels 42 of adjacent drive assemblies 40 is substantially equal to the spacing between the drive wheels 42 of the individual drive assembly 40. The drive wheels 42 project 15 upwardly from the drive rail housing such that it is the drive wheels 42 of the rail 12 which directly support the transport container 2. The wheels 42 are preferably mounted at approximately the same height to minimize tipping or rocking of the container 2 as it is moved along the rails 12. It is also known within the art to individually mount a passive wheel 43 between each drive wheel 42 (as shown in FIG. 1A).

It would be advantageous to provide a conveyor system that improves the performance of a conventional conveyor and reduces the costs of AMHS conveyor systems. The present invention provides such a conveyor.

SUMMARY

Inventions for a direct drive modular belt conveyor system are disclosed.

The conveyor system includes a cartridge, which defines an section of the conveyor. In one embodiment, the cartridge includes a number of wheels, which are designed as a unit for a conveyor section and the wheels of the cartridge are designed to hold a belt. A conveyor section, in one optional embodiment, includes integrated sensors for detecting the presence of a container (e.g., FOUP), and each conveyor section can implement precision sheet metal rails that facilitate high speed FOUP transport. In one embodiment, each conveyor section has two sides. Each side has a cartridge that has a belt. In particular embodiments, one side of the conveyor section includes a drive motor, that drives the conveyor.

The drive is then transferred to the other side of the conveyor section using a quick connect-disconnect drive shaft. The drive shaft, in one embodiment, provides for a substantially constant velocity for each of the two belts of the conveyor section. The drive shaft, in one embodiment, also does not include moving internal parts, and is designed for easy insert between wheels of each cartridge of opposing sides of the conveyor section. Each end of the drive shaft has a non-conventional shape that enables insertion at an angle and insertion into a wheel center and then subsequent insertion into the opposing wheel, all without having to disassemble the conveyor cartridges, conveyor walls or conveyor section in which the drive shaft is inserted or removed. In particular embodiments, due to the flexible modularity of the conveyor sections, particular sections can be disassembled, without having to disturb adjacent sections not being removed or serviced. In still another embodiment, the drive shaft, having the quick connect-disconnect features, enable quick removal to then quickly remove one or both cartridges of the conveyor section. Removal, in some cases, will be needed for servicing, or adjustments.

Conveyor systems used to handle material in semiconductor fabs require high reliability and at the same time quick access for repair in the event of a failure and/or maintenance. To address both issues, embodiments of the conveyor system provide straight sections that have been reduced to basic elements. Examples of these elements include the supporting structure, the drive system with integrated sensors, a modular cartridge for holding wheel rollers that support and drive a belt. The supporting structure could be, but not limited to, a metal frame (e.g., sheet metal channel) with a purpose to provide structural support and accurate location of a modular cartridge. In one embodiment, the cartridge system includes pod position sensors, drive system with idler wheels, interconnect boards with on-board diagnostic display and belt adjustment.

The drive shaft, as noted above, allows a very quick and easy assembly/disassembly without the need for any tools and without the need to displace the parts it transfers the torque between from their permanent assembly position. Thus, the shaft allows for angular and planar misalignment of the connected parts. Another aspect of the drive shaft is, that it is very reliable since it does not have internal movable parts. This makes the drive shaft low cost, and also defines its simple and intelligent design.

DESCRIPTION OF THE DRAWINGS

FIG. 2A illustrates a fabrication space in which conveyor systems are installed.

FIG. 15A illustrates a drive shaft being inserted into a wheel.

FIG. 15B illustrates a magnified view of clip inserted into a retaining clip groove.

DESCRIPTION

Figure 1A:
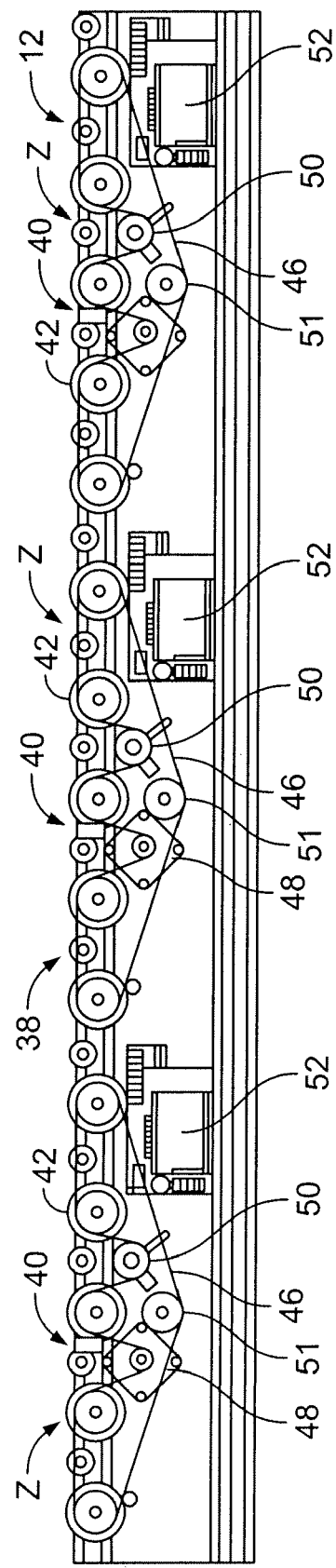
FIG. 1A illustrates a prior art conveyor system.

The invention defines a modular conveyor design, which is reduced to a few basic building blocks. Another embodiment is the quick connect/disconnect drive shaft, that couples two conveyor sides of a modular conveyor section.

Aspects of the design enhance its reliability, maintainability and serviceability. Embodiments of the present invention will become apparent from the following detailed description, taken in conjunction with the accompanying drawings, illustrating by way of example the principles of the invention.

I. Conveyor Cartridge Module

The cartridge module described herein offers quick serviceability and off-line testing/calibration. In the event that a motor, belt or idler pulley fails, a small section can be replaced as a unit, and repaired off-line. The cartridge module can be populated with different components in order to make it a driver or a follower unit.

There are many advantages of the new design, for instance, (1) a modular cartridge design, (2) quick access for diagnostics, replacement and repair, (3) quick release drive shaft with reduced backlash, (4) precision sheet metal rail to accurately locate the cartridge modules, (5) optimal wheel spacing for best driving performance (6) optimal peak speed for minimizing vibration of different FOUP structures, etc.

The scaling of these embodiments is not restricted to semiconductor wafers pods (FOUP), but it can be scaled to handle large flat panel display cassette, solar panels or PCB assembly conveyor systems. The cartridge concept described in this application can be made using a number of materials and manufacturing methods to further integrate parts and increase its modularity feature.

Drive components, sensors, and PCBs; in one embodiment, are all integrally mounted to the supporting structure of the CFT conveyor. The interbuilding link conveyor includes modular drive assemblies, but in one embodiment, all electronics and sensors still mount to the structural frame.

The direct drive modular belt conveyor cartridge with integrated systems include a direct drive system that couples a motor to a drive pulley with a plurality of idler wheels. In one embodiment, the belt tension is provided by a spring loaded shaft pushing on an idler wheel. The idler wheel in turn provide the necessary belt tension. The follower cartridge is powered via a drive shaft connecting the drive section to the driven cartridge. The drive shaft is designed such that a reduced backlash condition exist between both sections. As noted, one embodiment of the drive shaft is its designed quick disconnect scheme for fast removal and installation. Still in line with one embodiment; a hall sensor is mounted on the opposite idler wheel on both cartridges in order to sense if a belt has failed. The sensors used to monitor the position of the pod can be mounted on the cartridge and connected to a small circuit board. The circuit board uses LED lights to provide sensor status to the operator. The circuit board is required only on the drive cartridge.

Another aspect of the invention is that the cartridge is able to handle pods (e.g., FOUPs) at high speed. One aspect of the design lies in the wheel/idler spacing of the cartridge. To determine the best wheel spacing; two design parameters are used. First, a minimum of three wheels are in contact with the pod rails at all times during motion. Second, in order to obtain the best vibration and pod slip characteristics during motion at constant speed, the wheel spacing must be such that its forward velocity divided by the wheel spacing does not match the resonant frequency of the pod rail assembly.

Alternatively, an optimum drive speed may be selected for each different make or model of FOUP, such that the frequency of wheel impacts do not match the resonant frequency of that particular model of FOUP. This approach is of value because typical wheel impact frequencies will be on the order of 10-50 Hz, due to a maximum wheel spacing of 50-60 mm for best support of the FOUP rails and a desired peak velocity of 0.5-3.0 m/s, while the resonant frequencies of FOUPs range from 12-60 Hz depending on design.

For a complete understanding, the following figures illustrate aspects of the conveyor section and cartridge assemblies.

Figure 1B:
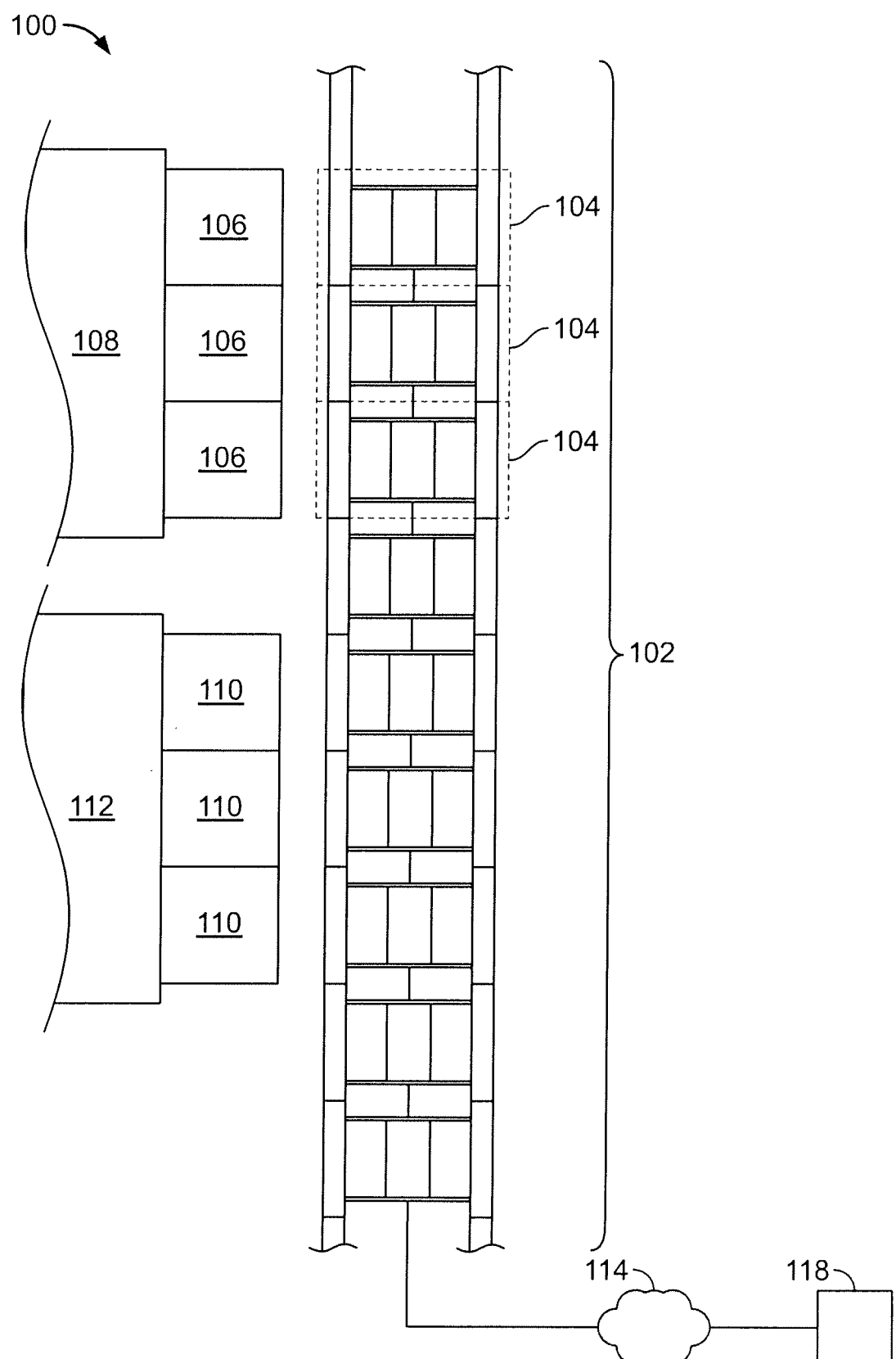
FIG. 1B illustrates a conveyor section being located next to load ports and processing tools.

FIG. 1B shows an exemplary view of a processing area 100 in accordance with one embodiment of the present invention. The processing area 100 can include a conveyor 102 that is made up of multiple conveyor segments 104. Conveyor 102 is designed for floor installation, although, the component parts are equally applicable to ceiling hung conveyor systems. The conveyor 102 can be configured to transport materials to and from tool 112 and tool 108. In one embodiment, semiconductor substrates are transported along the conveyor 102 in Front Opening Unified Pods (FOUPs) (not shown). A FOUP traveling along the conveyor 102 can be loaded into load port 106 or load port 110 and the semiconductor substrates can be processed within tool 108 or tool 112 respectively.

In one embodiment, the tool 108 and the tool 112 can be machines used in the processing of semiconductor substrates. Tool 108 and tool 112 may be the same tool or entirely different tools that perform similar or different functions. The embodiment illustrated in FIG. 1B shows each tool 108/112 having three load ports 106/110. This is merely illustrative of one embodiment and in other embodiments, more or fewer load ports could be associated with each respective tool.

In one embodiment, the conveyor segments 104 are modular assemblies that permit rapid service and maintenance of the conveyor 102. To facilitate rapid service and maintenance, each conveyor segment 104 can include belt modules, or belt cartridges that can be rapidly removed and replaced in order to minimize downtime for the conveyor 102. Each conveyor segment 104 can also include a motor to drive the belt modules along with a computer controller to activate and deactivate the motor(s). In one embodiment, the computer controllers for the conveyor segments 104 can be networked using a bus system to provide power and communications between the individual conveyor segments. Communications to the conveyer 102 can be performed using a network 114 that allows a computer 118 to monitor and control individual conveyor segments 104.

Figure 1C:
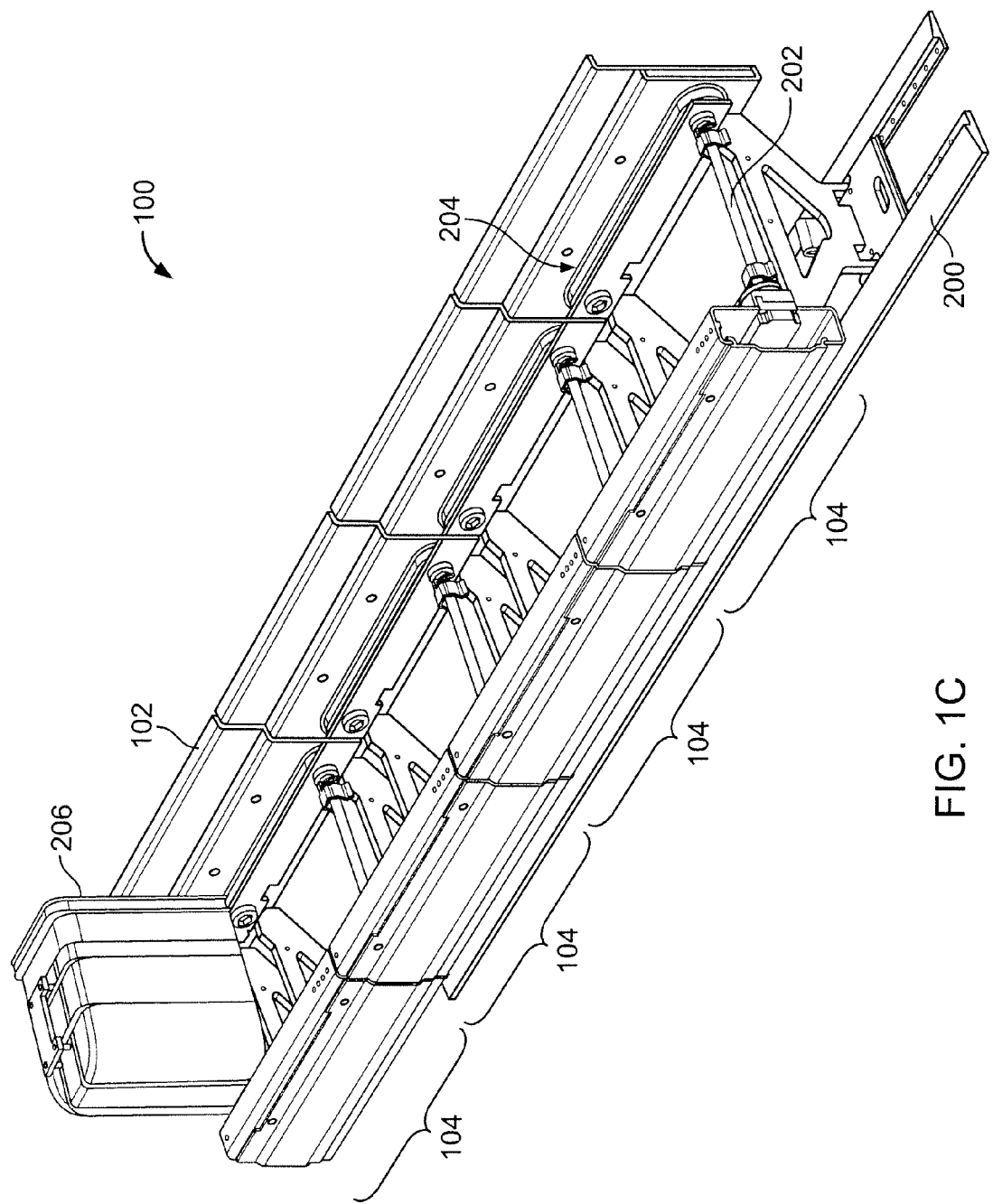
FIG. 1C illustrates a processing area.

FIG. 1C is an exemplary view of the processing area 100 in accordance with one embodiment of the present invention. In this exemplary embodiment, four conveyor segments 104 make up the conveyor 102. A FOUP 206 is shown on the conveyor 102 along with some belt modules 204 within the conveyor segments 104. In one embodiment a drive motor provides movement to a belt module on one side of the conveyor segment and a drive shaft 202 is used to transmit movement to the belt module on the other side of the conveyor segment. Also shown in FIG. 1C is support beam 200.

FIG. 2A illustrates a fabrication space in which conveyor systems are installed, in accordance with one embodiment of the present invention. As mentioned with reference to FIGS. 1B and 1C, conveyor systems are frequently installed on the floor of a fabrication space in order to transport material (e.g., semiconductor wafers, flat panels, and other substrates), through a number of processing operations. In the example shown in FIG. 2A, the floor conveyor is illustrated moving FOUPs 206 to and from fabrication equipment and, in this example, through a load port. The fabrication space can also include a ceiling mounted conveyor 102b. Ceiling conveyor 102b is used to transport FOUPs 206 from one location to another, store FOUPs during certain fabrication steps, and stock FOUPs depending on the operational state of the equipment within the fabrication space. In either example, the ceiling conveyor 102b can transport FOUPs from one location to another or hold FOUPs 206 for a period of time.

Figure 2B:
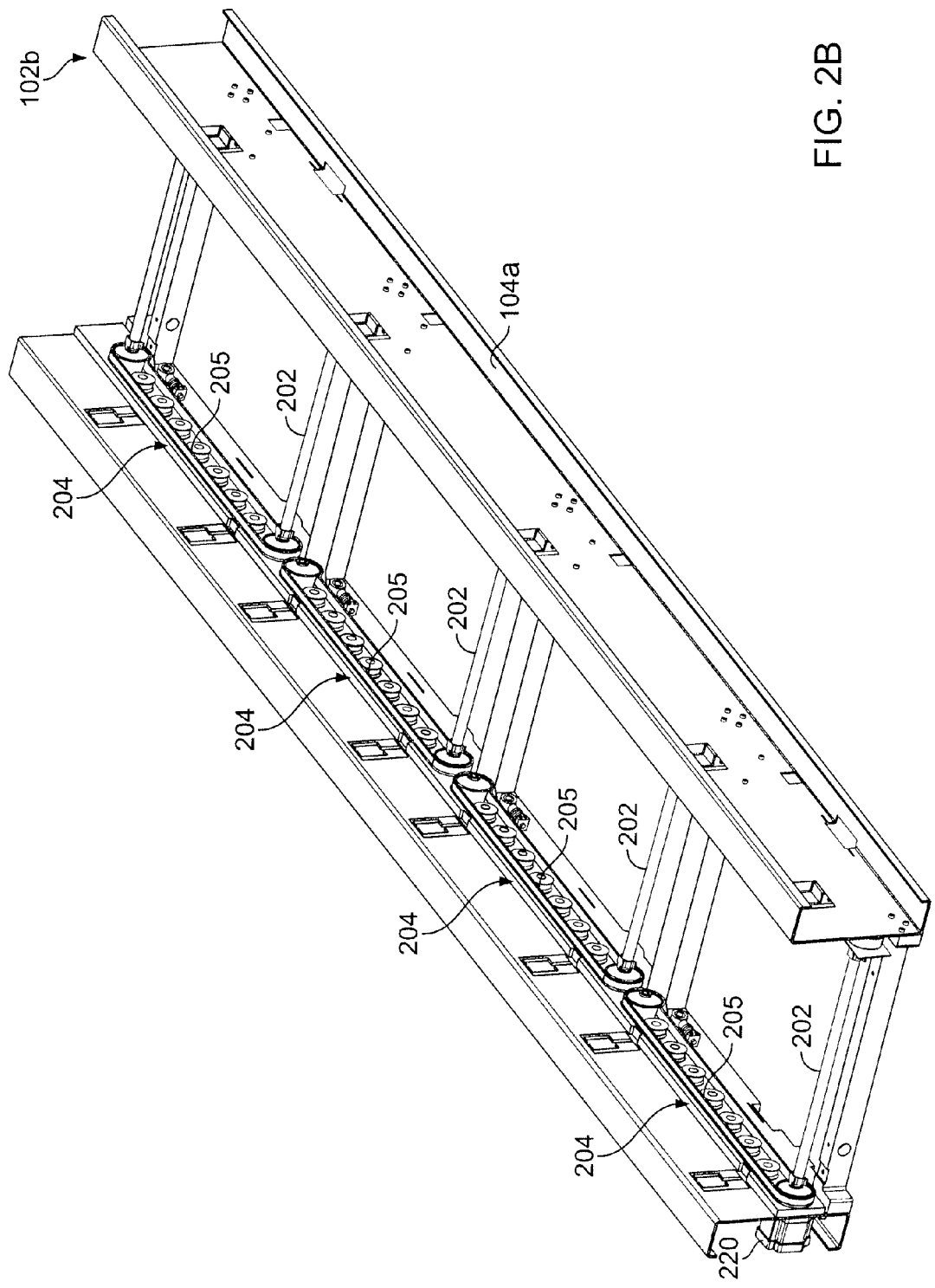
FIG. 2B illustrates a conveyor beam section of a ceiling conveyor.

FIG. 2B illustrates a conveyor beam section 104a of the ceiling conveyor 102b. The conveyor beam section 104a includes multiple conveyor sections that are defined by a number of cartridge modules 204. It should be understood that the conveyor beam 104a can take on any number of lengths, and the illustrated length of FIG. 2B is only for purposes of example. With this example in mind, the conveyor beam section 104a includes four distinct sections, where each section has a cartridge module 104 on either side of the conveyor beam sections 104a. As illustrated, cartridge modules 204 are installed onto the walls of the conveyor beam section 104a (on both sides). Each of the cartridge modules 204 include a conveyor belt 205 which allow for the transport of FOUPs along a distance of the conveyor beam 104a. Each of the cartridge modules 204 are designated to either be a drive module or a follower module. If the cartridge module 204 is a drive module, the cartridge module 204 will also couple to a direct drive motor 220. The direct drive motor 220 will drive the conveyor belt 205 of the cartridge module 204 on a given side, and will transfer the drive through a drive shaft 202 to a follower cartridge module 204 on the opposite side.

Figure 3:
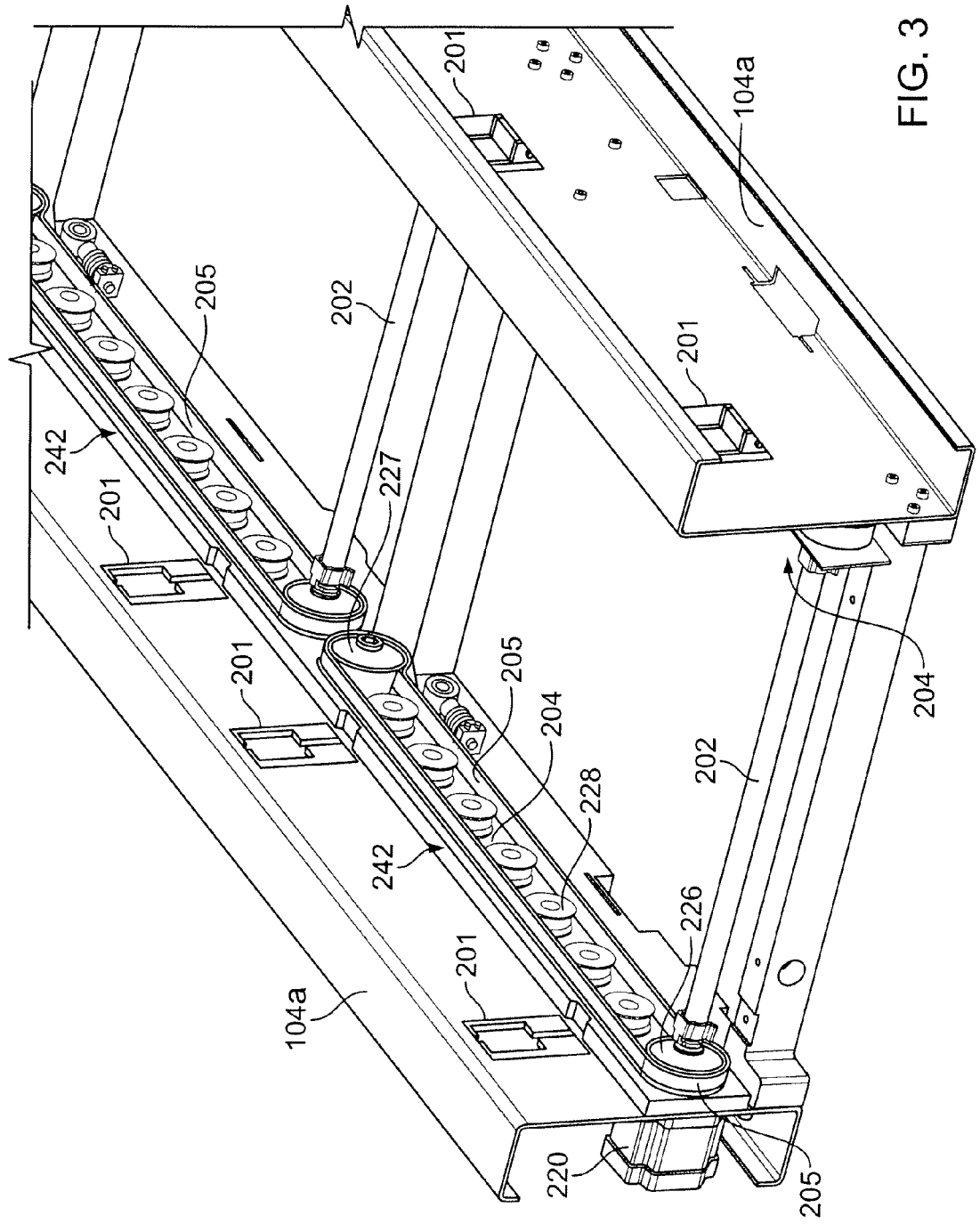
FIG. 3 illustrates a view of a cartridge module.

FIG. 3 illustrates a more detailed view of the cartridge module 204 that includes the belt 205, idler wheels 228, a drive pulley wheel 226, and a pulley wheel 227, which are installed onto a cartridge plate 242. As noted above, the cartridge module 204 can therefore be installed and removed from the conveyor beam section 104a by simply removing the cartridge plate 204 from the wall or beam. When the cartridge module 204 is removed, all parts are connected to the cartridge plate 242. As such, it is possible to remove the cartridge module 204 quickly and rapidly from a section of the conveyor—on one or both sides of a section. As noted, removal of the cartridge module 204 may be necessary for either maintenance, repair, or installation of a new cartridge module 204 with very little downtime. Additionally, if a particular cartridge module 204 is being removed, or replaced, it is possible to continue operational use of the remaining cartridge modules of the conveyor system while the particular section is in service or is quickly replaced.

Additionally connected to the conveyor beam section 104a, are position sensors 201. Position sensors 201 will allow the sensing of FOUPs which may be traveling along conveyor belt at different conveyor sections. This information will then be fed back to the computer system which monitors the location, transport, and position of all FOUPs throughout the fabrication space. The drive shaft 202 is shown connected between the cartridge module 204 of one side with cartridge module 204 of the opposite side. The drive shaft 202 will transfer the drive from the driven cartridge module 204 to the follower cartridge module 204 on the opposite side.

Accordingly, it is possible to provide a single direct drive motor 220 on one side which connects to the other side via the drive shaft 202. As illustrated, the cartridge module 204 will then be repeated over and over again for different sections of the conveyor system, and each of the cartridge modules are capable of being installed and removed in an efficient manner as a unit when connected or disconnected to the beam of the conveyor system. The cartridge modules 204 can also take on any number of lengths, depending on its operation or configuration. One example length can be 0.25 meter, 0.5 meter, 0.75 meter, 1.0 meter, 1.5 meter, 2 meter, etc., depending on its application.

Figure 4:
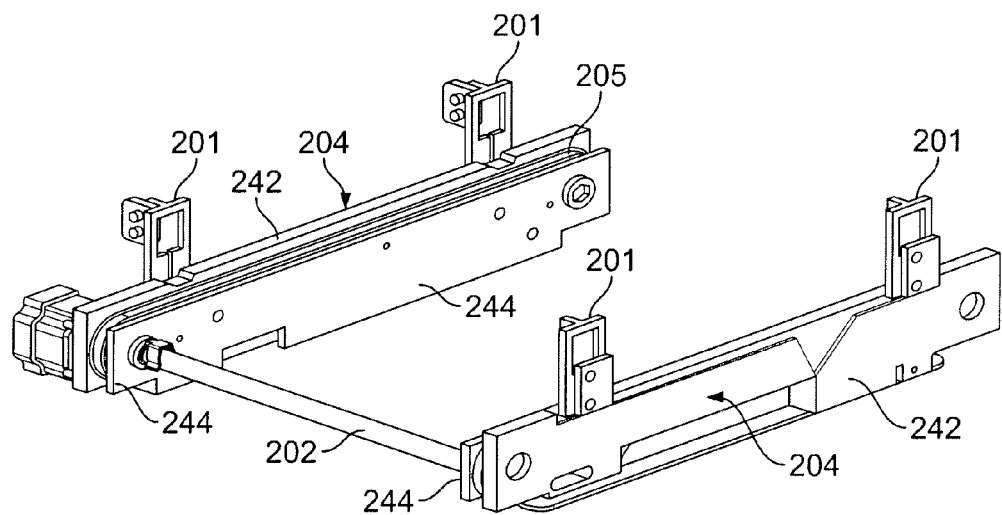
FIG. 4 illustrates a diagram of a cartridge module when not connected to a conveyor beam section.

FIG. 4 illustrates a simplified diagram of the cartridge modules 204 when not connected to the conveyor beam section 104a. As noted above, one of the cartridge modules 204 is a driven cartridge module, and the opposite cartridge module is a follower cartridge module which receives its drive through the drive shaft 202. Drive shaft 202 is a quick release drive shaft which will be explained in more detail below. The belt 205 has an exposed surface which will then receive the bottom surface or plate of a particular FOUP or carrier. As noted herein, specific reference to FOUPs have been made, however, it should be understood that any type of carrier than can transport material may sit over the conveyor belt, and such material or carriers can be transported along the multiple sections of conveyor belts along different areas of a space. FIG. 4 illustrates the integrated FOUP position sensors 201, which are connected to the cartridge plate 242. Thus, the two cartridge modules are opposing cartridge modules which are connected through a drive shaft 202. Each of the cartridge modules 204 also include, in one embodiment, a cartridge cover 244, which hides the wheels described above.

Figure 5:
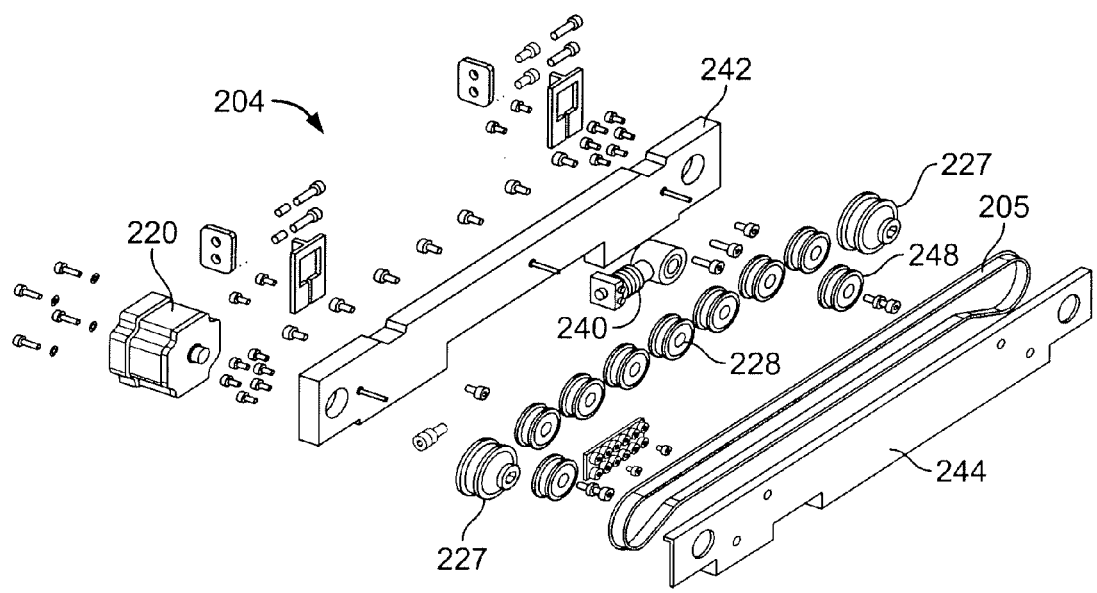
FIG. 5 illustrates an exploded view of a cartridge module.

FIG. 5 illustrates an exploded view of the cartridge module 204, in accordance with one embodiment of the present invention. The cartridge module 204 is shown with a multiple number of parts, such as screws and fastening hardware to bring together the multiple parts that define the cartridge module 204. Although shown in great detail with respect to the number of screws and attachment locations, it should be understood that the various screws, attachment locations, and part shapes can vary so long as the functionality and application enable the integrated definition of the cartridge module 204. The cartridge module 204 therefore includes the cartridge plate 242 which receives the idler wheels 228, the drive pulley wheel 226, the pulley wheel 227, the direct drive motor 220, the belt 205, the cartridge cover 244, the belt tensioning idler wheel 248, and the belt tensioning mechanism 240.

Figure 6:
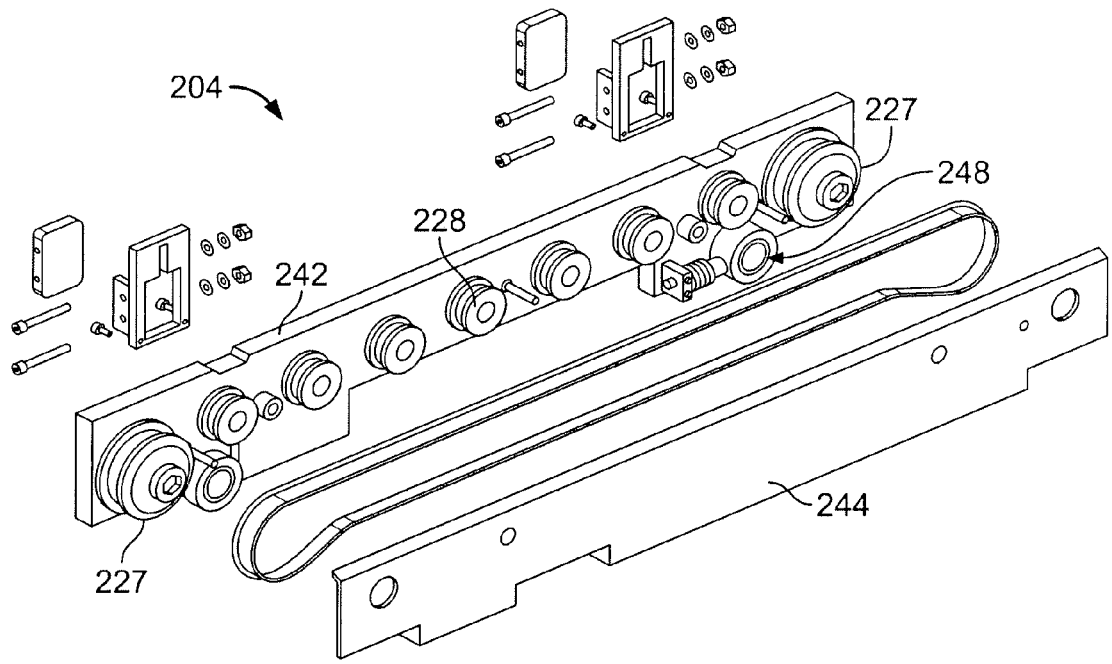
FIG. 6 illustrates a cartridge module configured as a follower cartridge assembly.

FIG. 6 illustrates the cartridge module 204, when configured as a follower cartridge assembly. The cartridge plate 242 is shown assembled with the various wheels and the belt tensioning idler wheel 248. The sensor hardware and sensors that define the position sensors 201 are also shown in exploded view before assembled onto the cartridge plate 242. The belt 205, having a raised lip on a side close to the cartridge plate 242, is shown before it is attached to the wheels of the cartridge module 204. Once assembled, the cartridge module 204 receives the cartridge cover 244.

Figure 7:
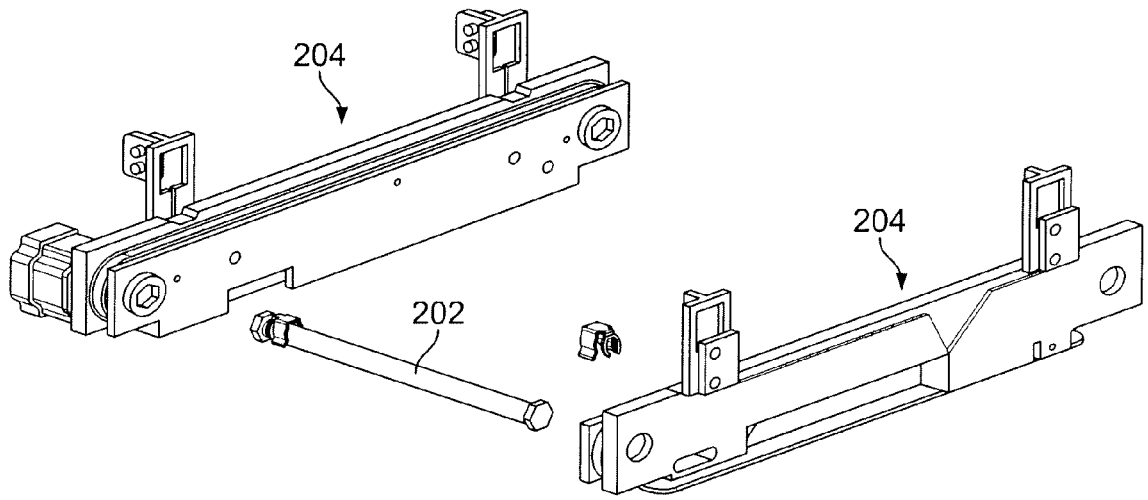
FIG. 7 illustrates a pair of cartridge modules.

FIG. 7 illustrates a pair of cartridge modules 204, where once cartridge module operates as drive cartridge module and the other cartridge module operates as a follower cartridge module. The drive shaft 202 is illustrated between the pair of cartridge modules 204. It should be noted that each of the cartridge modules 204 are then attached to sidewalls of the conveyor beam section 104a for a ceiling conveyor, and a conveyor section 104 of a floor conveyor, as shown in FIG. 2A.

In the example of FIG. 2B, for a ceiling conveyor, beam section 104a is shown to have four distinct sections with pairs of the cartridge modules 204, defining and 8-cartridge module stretch of conveyor. However, the conveyor beam section 104a may be of a number of sizes, and the four section beam is only shown for purposes of illustration and example.

II. Quick Connect/Disconnect Drive Shaft

The drive shaft 202 consists of torque transfer tube to both sides. Each end of the tube receives a plug. In one example embodiment, these plugs have a male hexagonal crowned outside shape, which engages the corresponding female straight hexagonal hole in the parts the drive shaft is transferring the torque. The outside diameter of the torque tube is smaller than the distance between the corresponding parallel sides of the female hexagonal holes of the parts the shaft is connecting, i.e. the tube's outside diameter is smaller than the diameter of that inscribed in the hexagonal hole's circle. The axial working position of the shaft is secured by two retaining clips, one at each side of the shaft. The clip engages retaining ring grooves in the shaft plugs inside of the crowned hexagonal shape of each plug, and is secured to the torque tube of the shaft with a spring clip feature of its design (e.g., defining a retaining clip). The two retaining clips function to not allow the shaft to shift it's working position sideways (coaxially to ifs own axis of rotation), by having a larger size than the hexagonal holes of the parts the shaft is connecting.

During assembly of the shaft, one or both retaining clips are removed from the shaft by hand, and one end of the shaft is inserted into the hexagonal hole of one of the parts the shaft connects (e.g., wheels). The shape of the shaft plug (size and crowned shape) allows the shaft to be inserted in the hexagonal hole at certain angle relative to the axis of rotation of the assembly, and as far into the driving/driven part it engages, as needed for the other end of the shaft to clear the inside of the other part it connects to. The shaft then is being aligned coaxially with the axis of rotation of the assembly and moved transversely engaging the other part's hexagonal hole, rotating it about assembly axis of rotation if needed. Both retaining clips are clipped onto the shaft by hand, engaging the retaining clips channels on the shaft's plugs and the assembly is ready to be used.

For disassembly of the shaft, one retaining clip needs to be removed from the shaft by hand, the shaft then pushed into the hexagonal hole of the mating part towards this end of the shaft where the clip has been removed, until the other end of the shaft (e.g., the other shaft plug) comes completely out of the hexagonal hole of the other mating part, allowing the shaft to be rotated about the geometric center of the crowned hex plug and pulled clear out of the mating hex hole of the part it drives.

For a complete understanding, the following figures illustrate aspects of the drive shaft, clips and connect/disconnect process.

Figure 8:
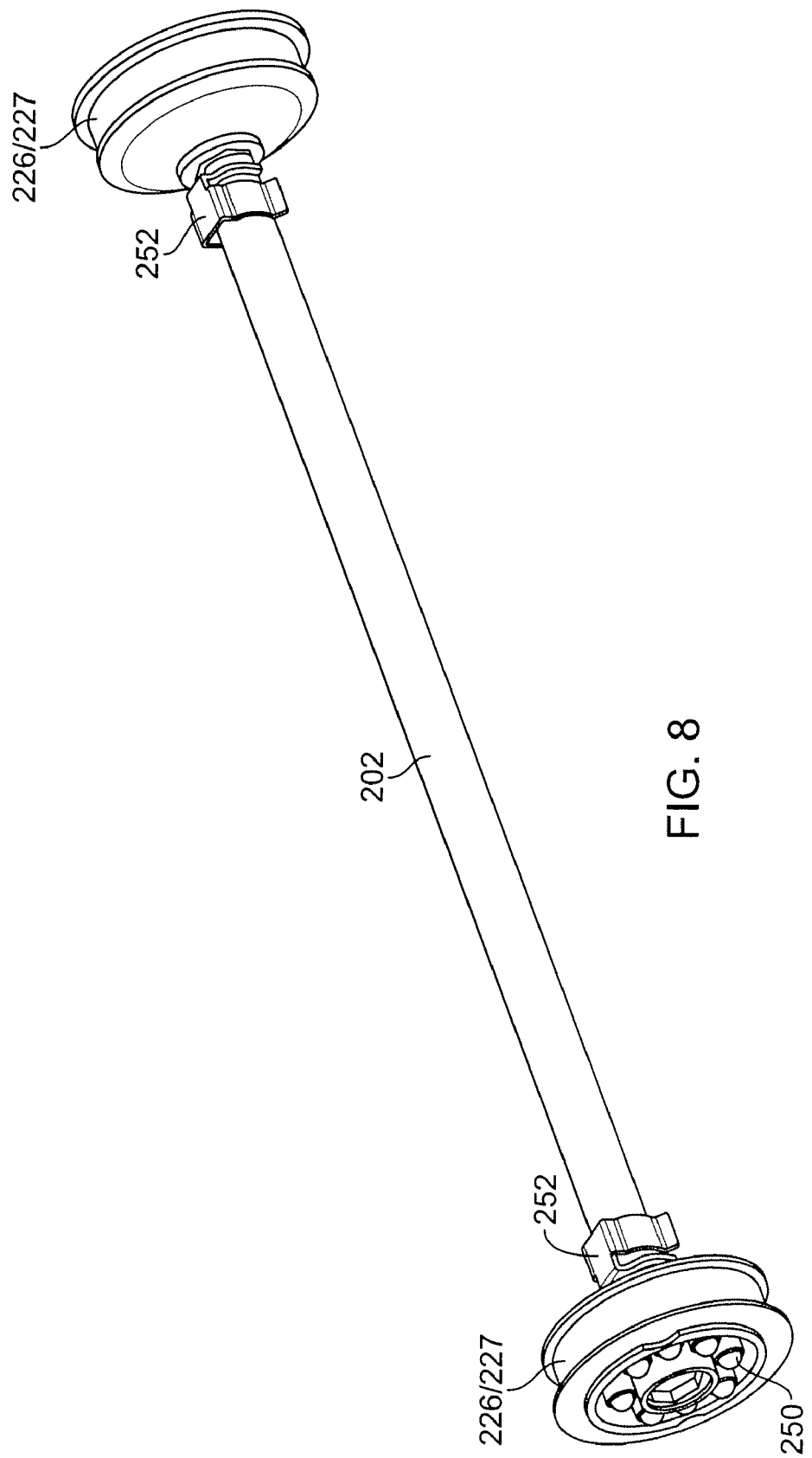
FIG. 8 illustrates a diagram of a drive shaft connected between wheel pulleys.

FIG. 8 illustrates a more detailed diagram of the drive shaft 202 connected between wheel pulleys 226/227. The drive shaft 202 at each end is shown with clips 252 that secure the drive shaft 202 to a specific position once inserted into a slot of the wheels 226/227. The wheels 226/227 are allowed to rotate freely by bearings 250. Bearings 250 have an assembly that connects directly to the stationary cartridge module 204. Thus, the wheel 226/227 is allowed to rotate about the bearings 250 once driven by the direct drive motor 220, or the drive shaft 202. Drive shaft 202 provides torque transfer by its unitary construction without the need to have multiple pieces. Thus, maintenance issues associated with the drive shaft 202 are essentially eliminated as the drive shaft 202 remains as a single piece that can be inserted or removed from its engaged position with the wheels 226/227.

Figure 10:
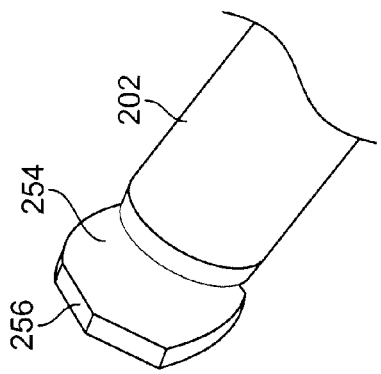
FIG. 10 illustrates an edge holding a drive shaft in place.
Figure 9A:
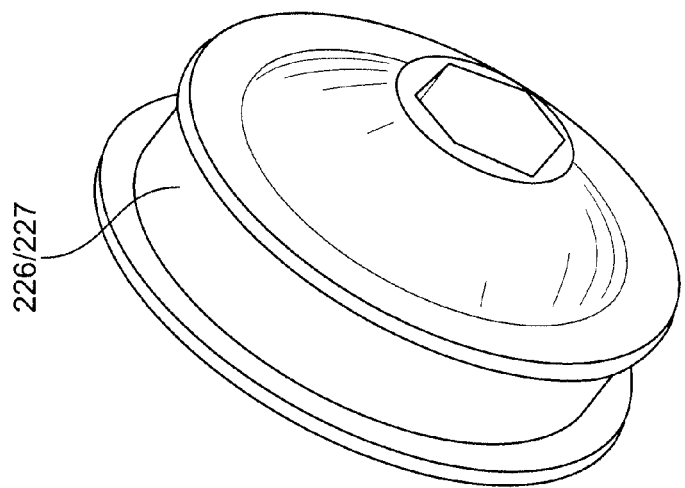
FIG. 9A illustrates a three dimensional perspective of a clip.
Figure 9A:
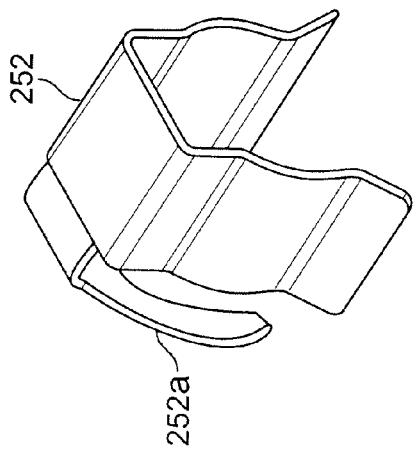
Figure 9B:
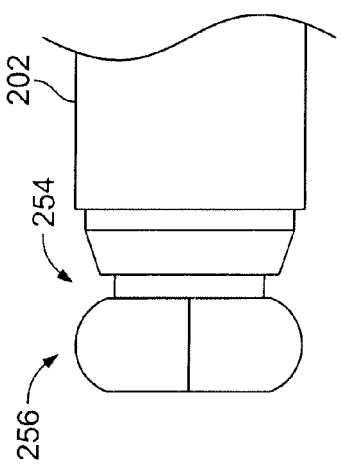
FIG. 9B illustrates an end of a drive shaft connected to a connector plug.

FIG. 9A illustrates a 3-dimensional perspective of a clip 252. Clip 252 is designed to be easily inserted and removed from the drive shaft 202, in accordance with one embodiment of the present invention. In one embodiment, the clip 252 can be hand-removed without the need for special tools. FIG. 9B illustrates an end of the drive shaft 202, connected to a connector plug 256. Connector plug 256, in one embodiment, is defined in a hexagonal shape. Other shapes may also be used so long as the shape can mate with the similar shape on the wheels 226/227. For instance, the shape of the connect plug 256 can take on a square shape, triangular shape, octagonal shape, key shape, or any other suitable shape that can grip a mating shape formed on the wheels 226/227. The end of the connector plug 256 also includes a retaining clip groove 254. Retaining clip groove 254 is designed such that an edge 252a of clip 252 can slide into the retaining clip groove 254. The clip 252 is slid over the drive shaft 202 such that edge 252a slides into retaining clip groove 254. The edge 252a will thus hold the drive shaft 202 in place and prevent the connector plug 256 from further inserting into the wheels 226/227, as shown in FIG. 10.

Figure 11:
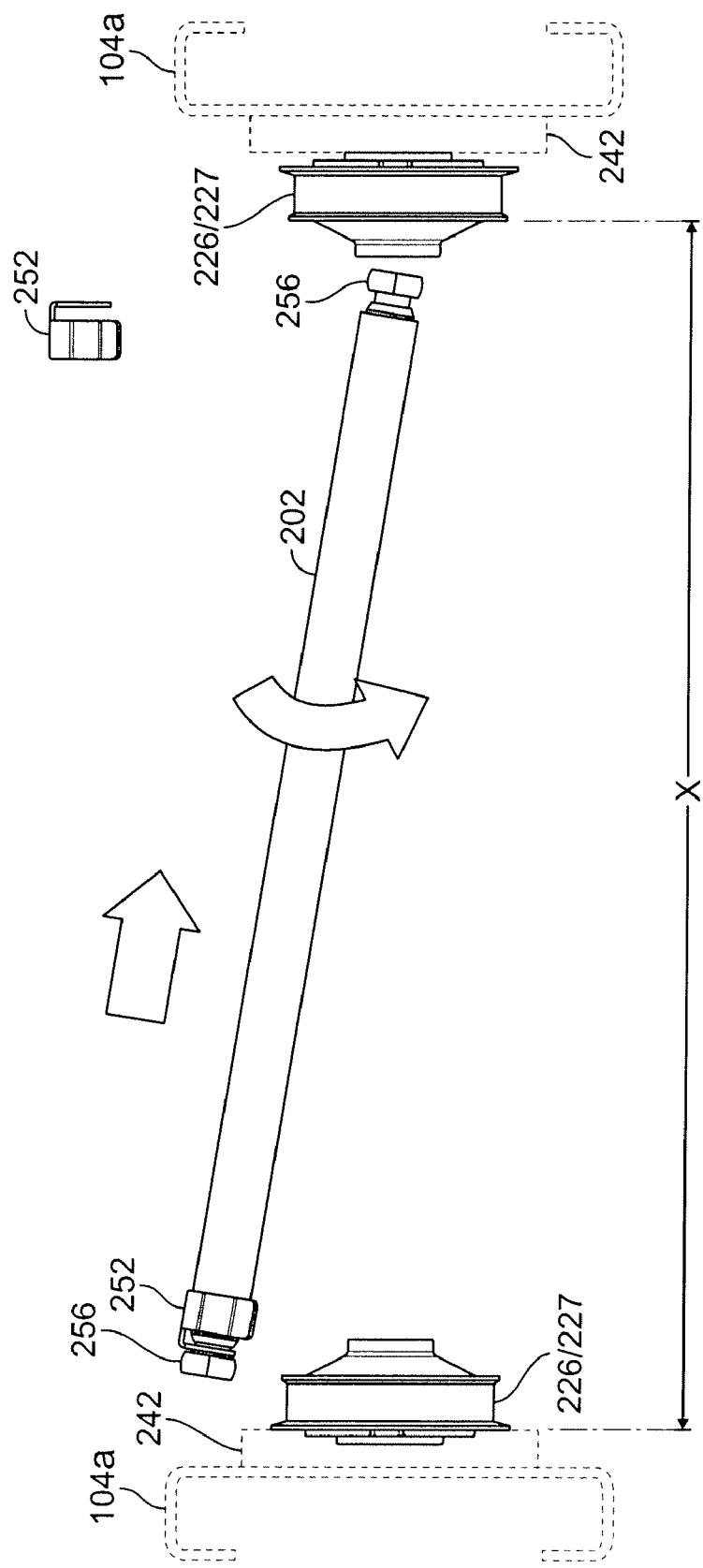
FIG. 11 illustrates a drive shaft inserted into wheels.

FIG. 11 illustrates an example of when drive shaft 202 is inserted into the wheels 226/227, in accordance with one embodiment of the present invention. To insert the drive shaft 202, an example is illustrated where the right portion of the drive shaft 202 is inserted into the right wheel 226/227. If the right side is inserted first, the clip 252 is removed from the drive shaft to enable the drive shaft 202, as well as the connector plug 256, to be 10 inserted into the female portion of the wheel 226/227. The drive shaft 202 is allowed to be inserted into the wheel 226/227 at an angle into the hole of the wheel 226/227 due to the crown shape of the connector plug 256, which allows entry at an angle relative to horizontal.

The connector plug 256 is also allowed to enter into the hole of the wheel 226/227, slightly past the retaining clip groove 254, and partially allowing the drive shaft 202 to enter into the hole of the wheel 226/227. It should be noted that the distance X is fixed by the definition of the conveyor beams 104a and the cartridge plates 242 of the cartridge modules 204. Accordingly, the drive shaft 202, if it were not allowed to pivot into the hole of the wheel 226/227, would be too long to be inserted into the hole of one wheel and then inserted into the opposing wheel.

Figure 12:
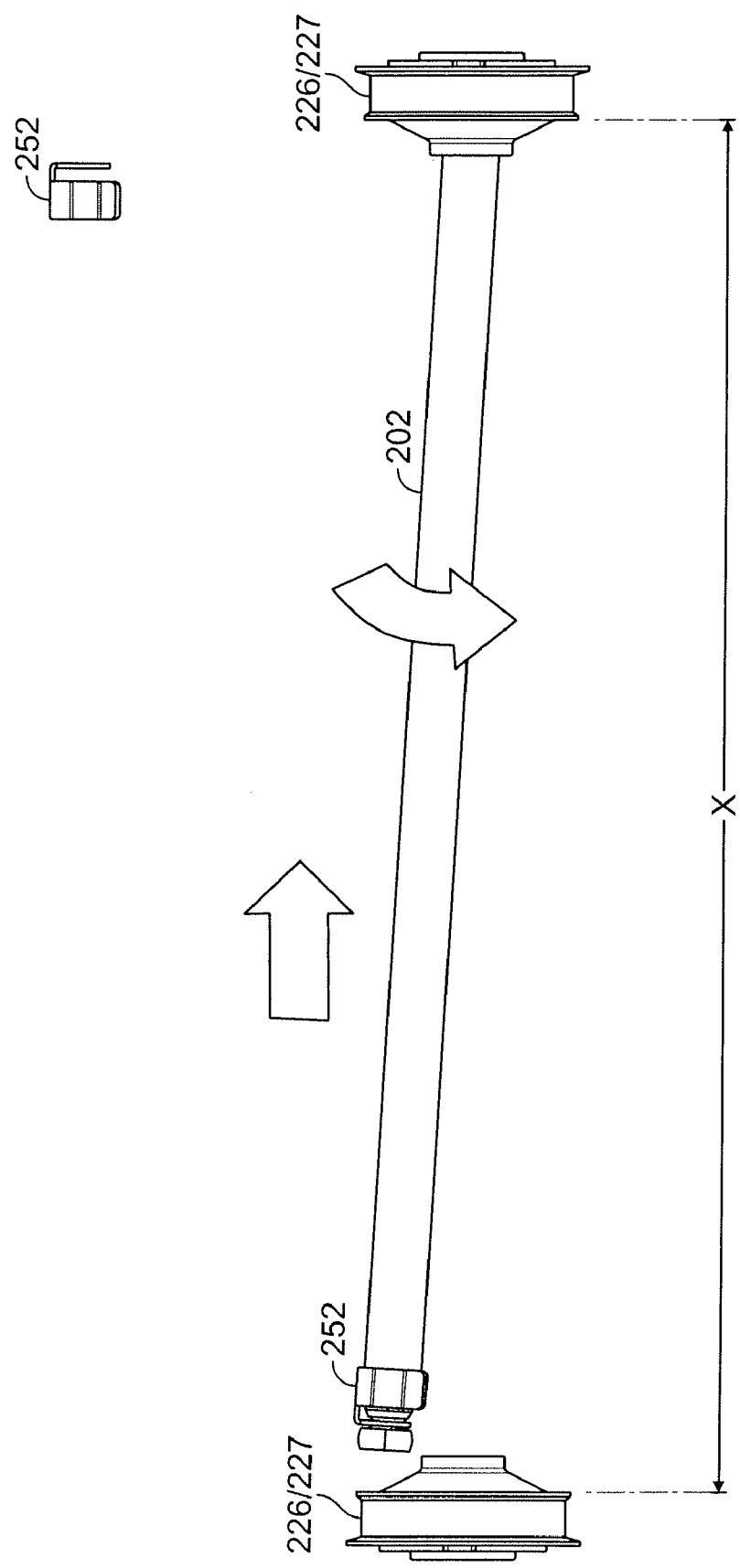
FIG. 12 illustrates a drive shaft inserted into a hole of a wheel.
Figure 13:
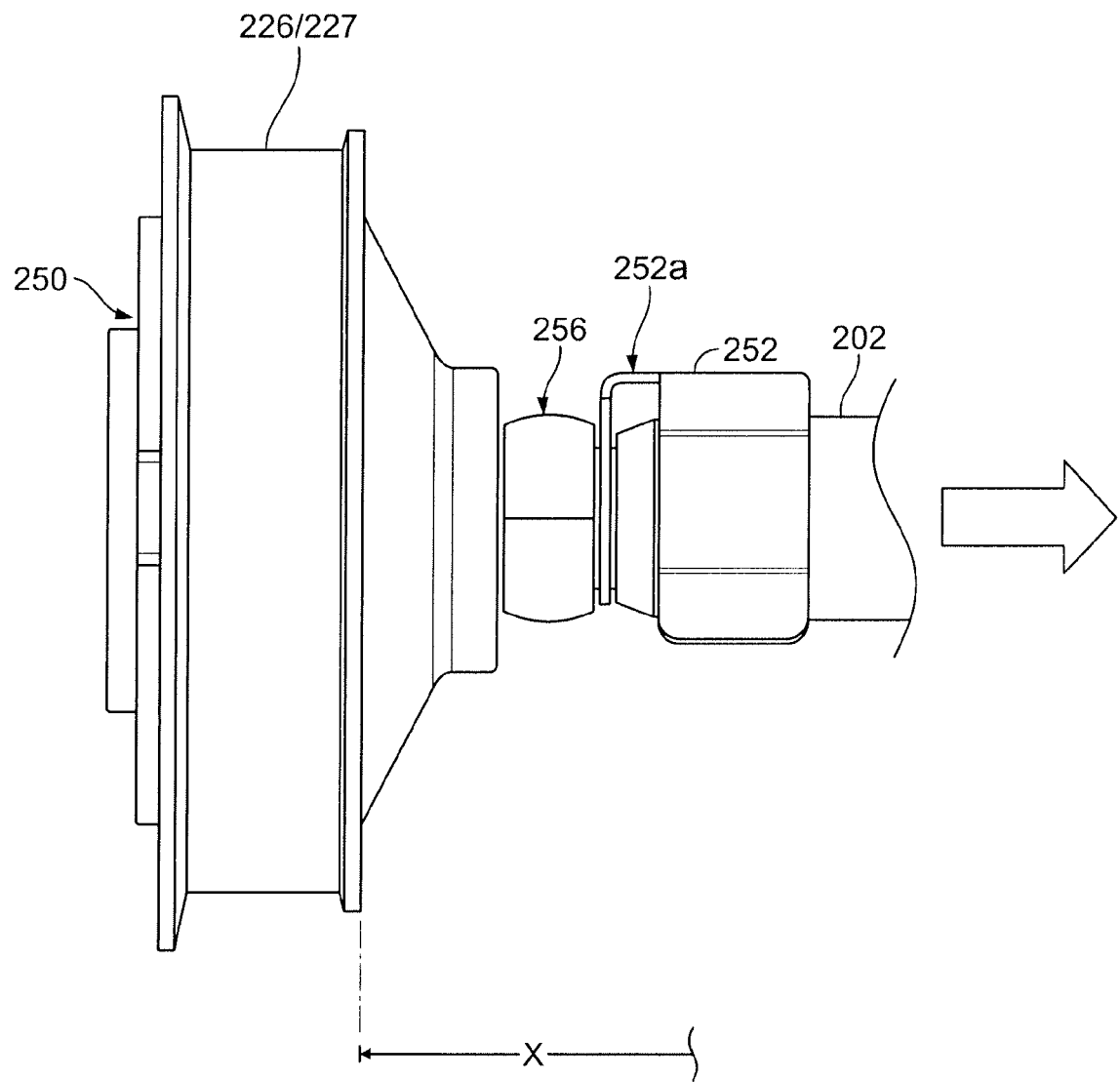
FIG. 13 illustrates a magnified view of the left side of the drive shaft.

FIG. 12 illustrates the drive shaft 202 inserted into hole of the rightmost wheel 226/227, past the retaining clip groove 254, and partially allowing the drive shaft 202 to enter into the wheel 226/227. Once inside the wheel on the right side, the drive shaft is then moved down and aligned with the left wheel. At this point, clip 252 has not been applied to the right side of the drive shaft, as the connector plug 256 currently sits inside of wheel 226/227. FIG. 13 illustrates a magnified view of the left side of the drive shaft where the connector plug 256 clears the edge of the wheel 226/227. This left side of the drive shaft will include the clip 252 already in an inserted position, such that edge 252a will act as a barrier to prevent the drive shaft 202 from sliding into the left and into the wheel more than dictated by the surface of edge 252a.

Figure 14:
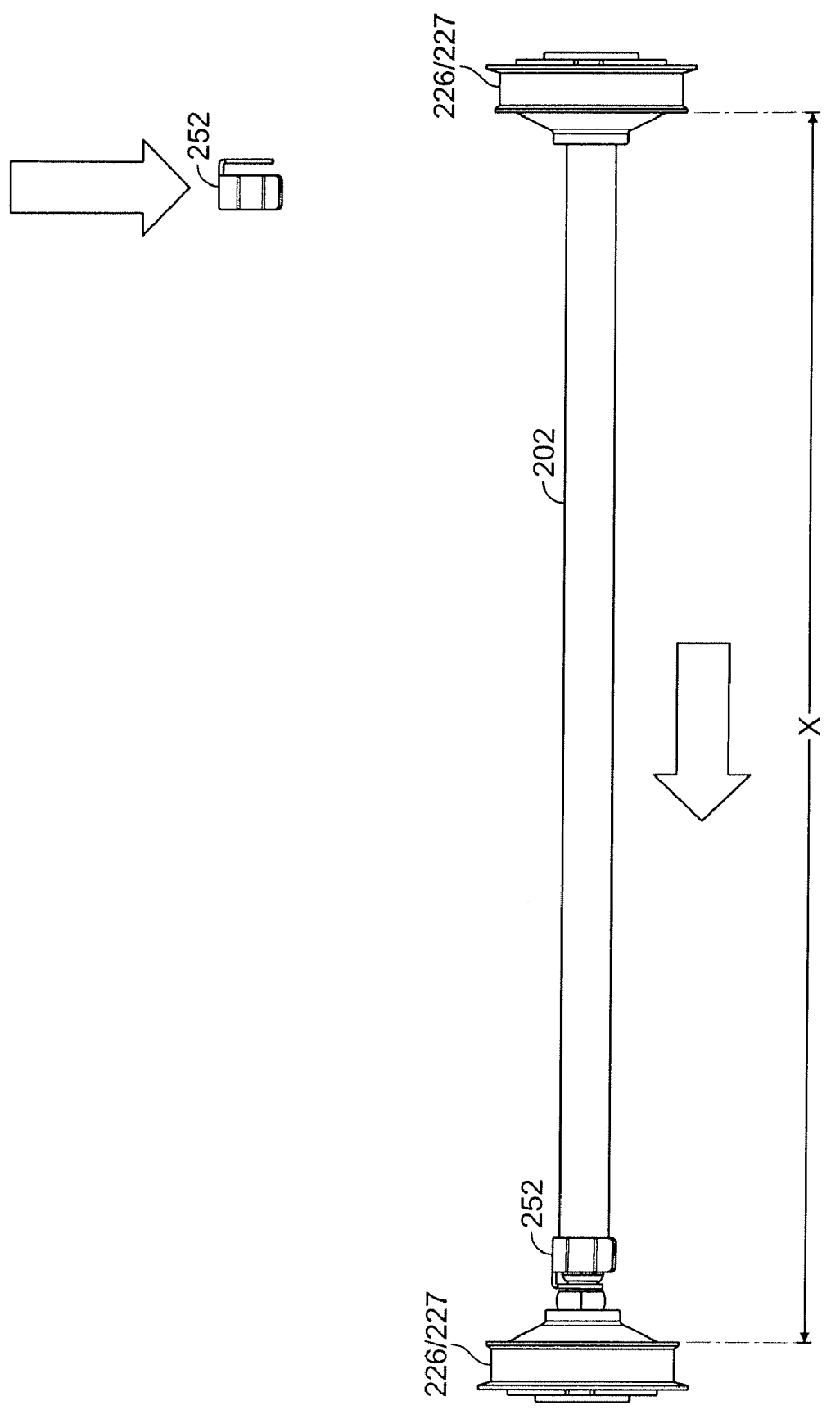
FIG. 14 illustrates a drive shaft being slid to the left and inserted into a wheel.

FIG. 14 shows the drive shaft being slid to the left and inserted into the wheel 226/227. Again, the edge 252a of clip 252 will stop the drive shaft 202 from sliding too far into the wheel, as shown in FIG. 14. FIG. 15A shows an illustration of the drive shaft being inserted, on the left, into wheel 226/227 and stopped by clip 252. On the right side, the drive shaft 202 will now be aligned and sufficiently removed from inside wheel 226/227 to allow clip 252 to be inserted. Clip 252 on the right side and on the left side of shaft 202, will retain the drive shaft in its proper position once inserted between both left and right wheels of the assembly. FIG. 15B illustrates a magnified view of clip 252 which was inserted into the retaining clip groove 254 of the connector plug 256.

Figure 16:
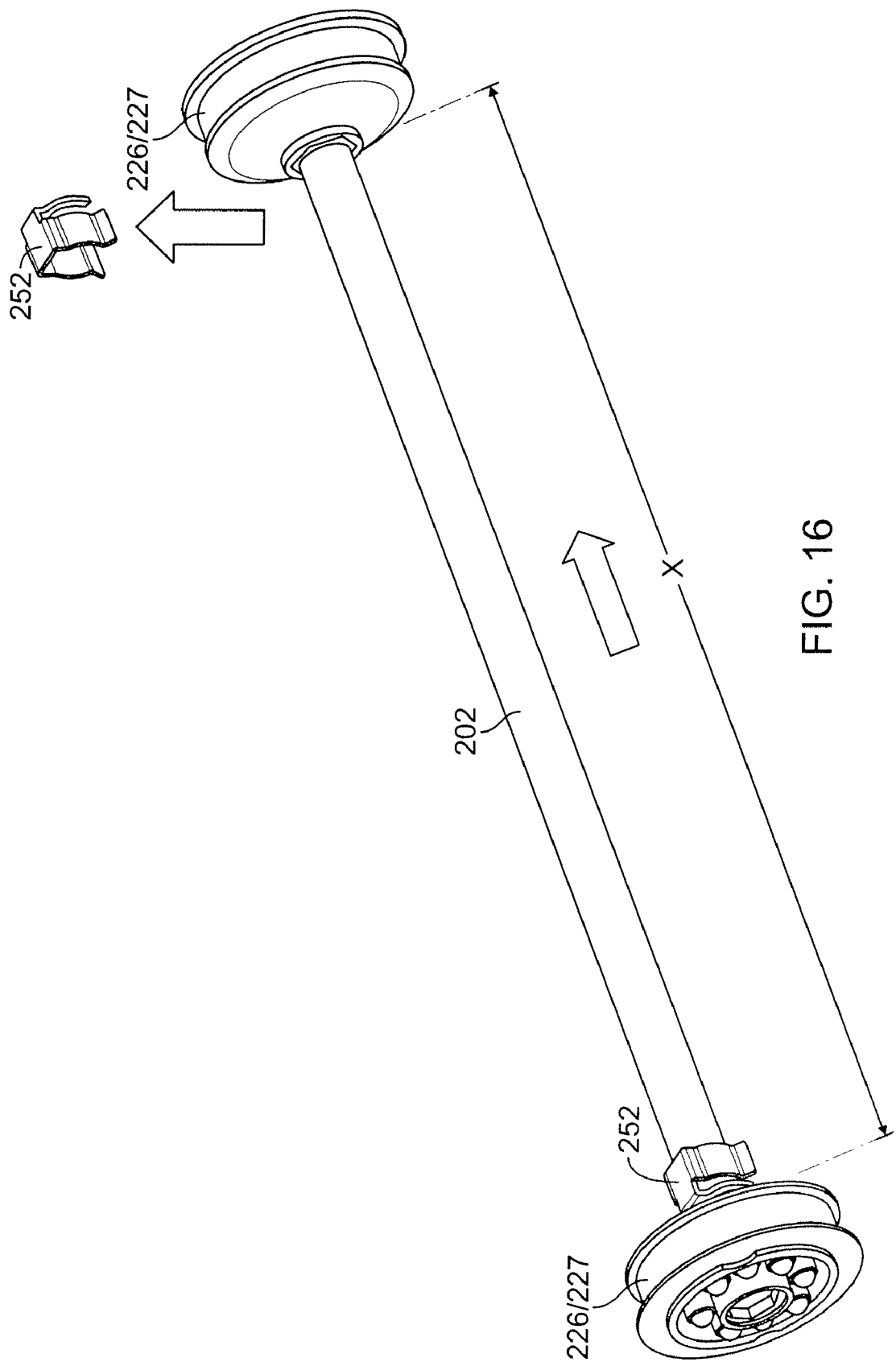
FIG. 16 illustrates a drive shaft, wheels, and clips.
Figure 17:
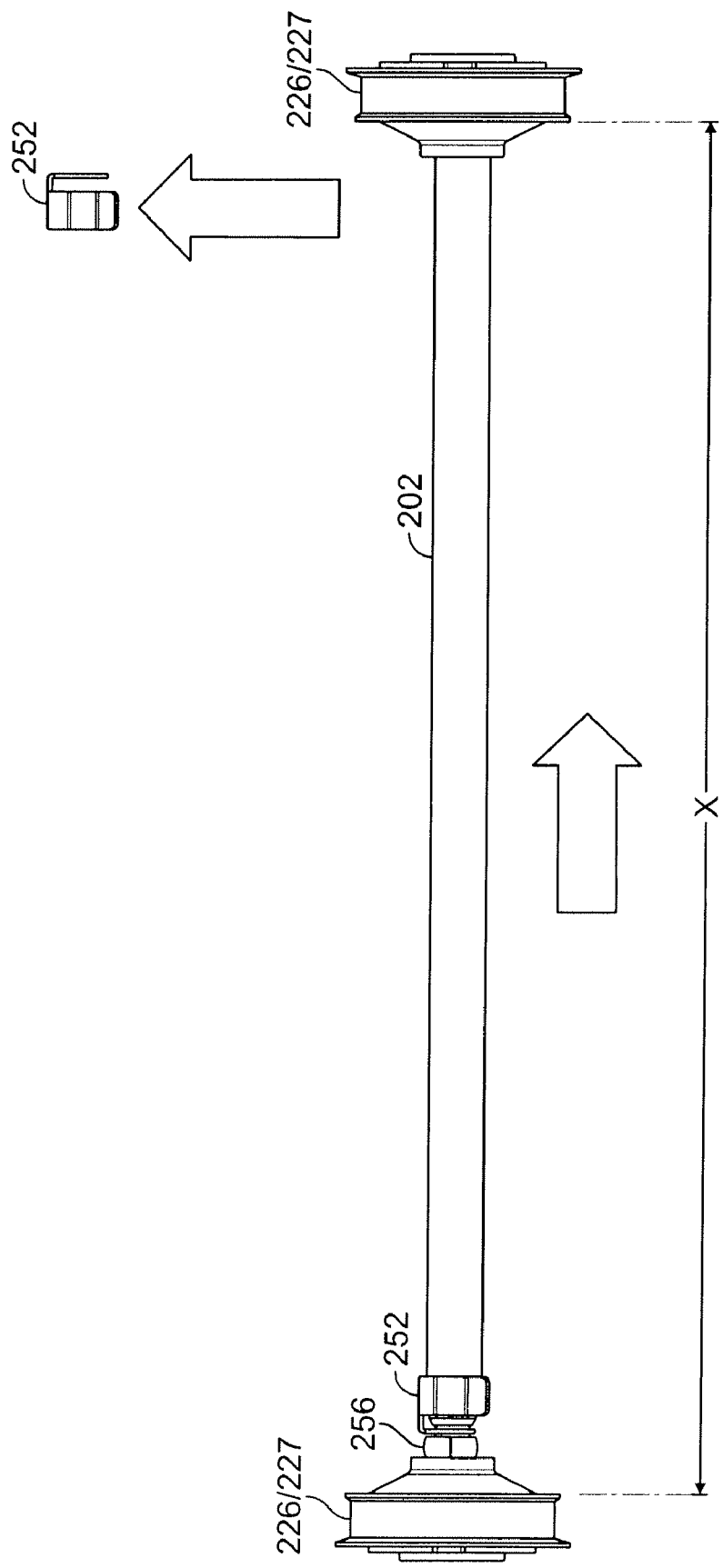
FIG. 17 illustrates a drive shaft after being pushed into a wheel.
Figure 18:
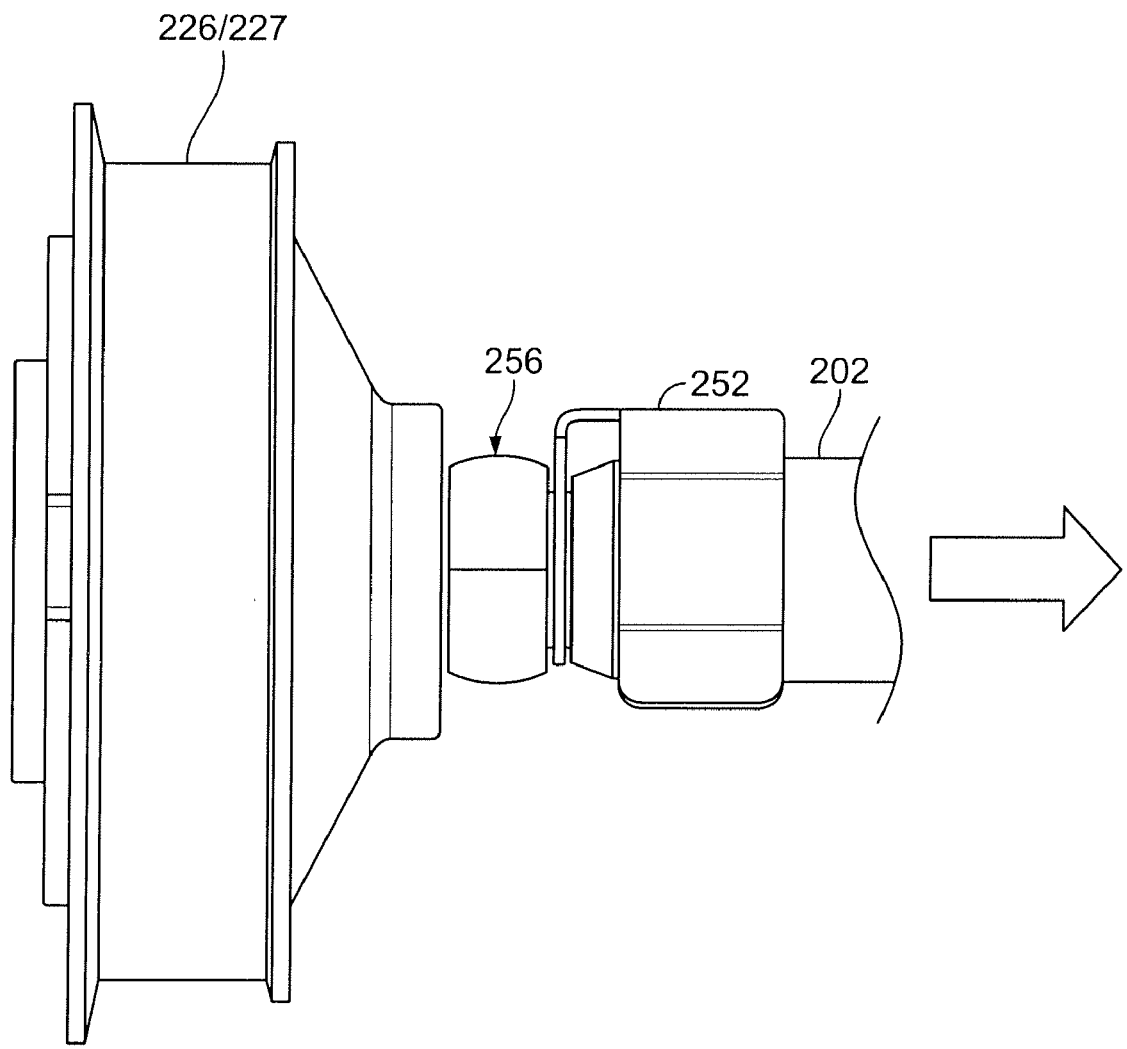
FIG. 18 illustrates a magnified view of a connector plug clearing a wheel.

FIG. 16 illustrates the drive shaft 202, wheels 226/227, and clips 252 being utilized in the process of removing the drive shaft from between the two wheels. As mentioned above, the two wheels are shown for ease of illustration in a three-dimensional perspective, but are actually part of the cartridge module and will retain the fixed distance X once installed. The removal of the drive shaft 202 is assumed to occur when the fixed distance X remains in place. The first step would be to remove clip 252 from the right side (or left) of the wheel 226/227 and then push the shaft away from the left side and into the wheel such that the connector plug 256 is now inside of wheel 226/227 on the right side. FIG. 17 shows drive shaft 202 after being pushed into the right wheel 226/227. Additionally, the connector plug 256 on the left is now shown clearing the wheel 226/227 on the left side. FIG. 18 shows a magnified view of the connector plug 256 clearing the wheel 226/227 before being rotated at an angle away from the wheel.

Figure 19:
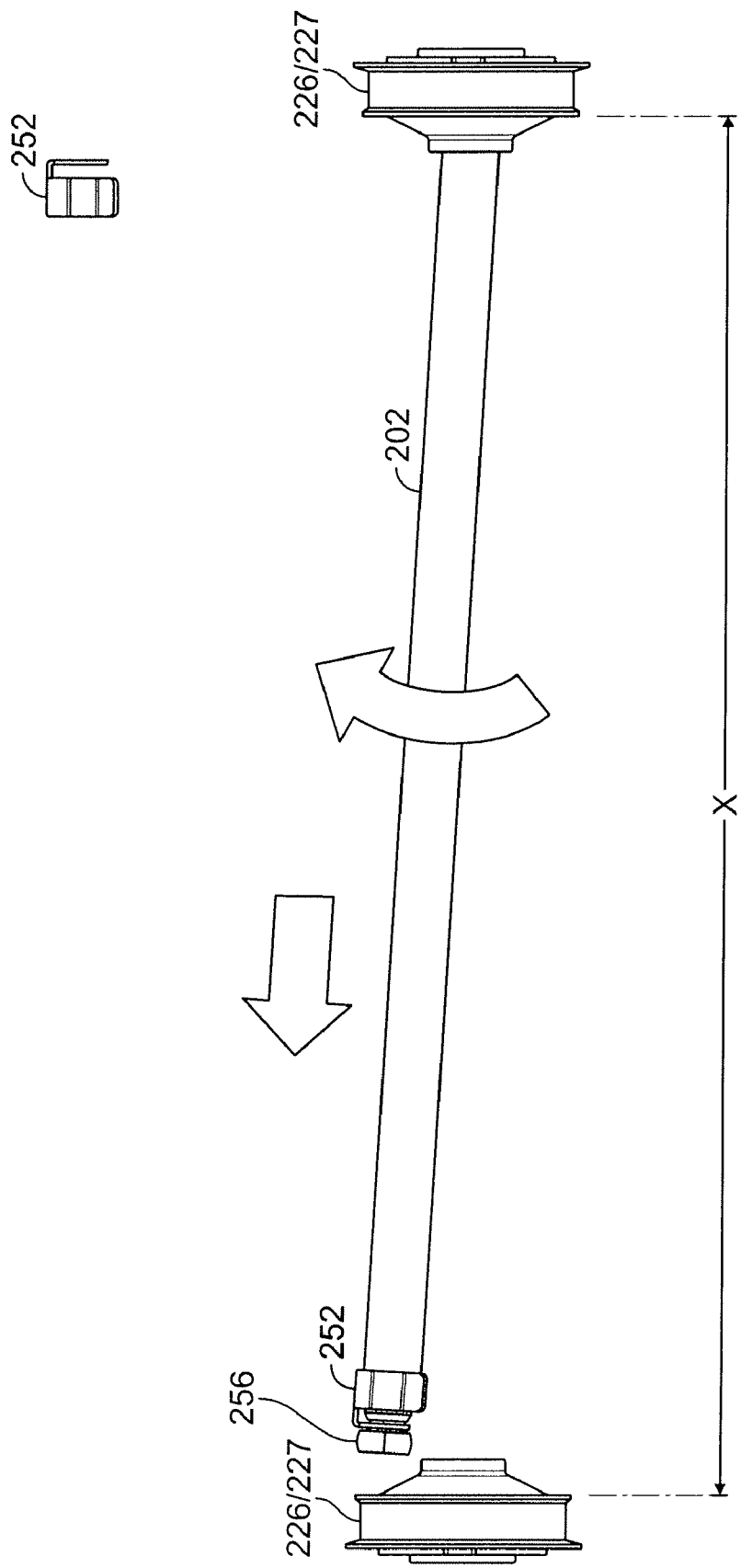
FIG. 19 illustrates a shaft being pulled away at an angle from a wheel.

FIG. 19 illustrates the shaft 202 being pulled away at an angle from the leftmost wheel, while allowing the opposite end to pivot within the wheel 226/227. As mentioned above, the connector plug 256 preferably has a crowned shape which allows the connector plug to pivot within the cavity/hole/slot of the wheel 226/227. It should be noted that even when the drive shaft 202 is placed at an angle relative to a particular wheel, sufficient contact is made within the drive mechanism and shape of the wheel that the drive shaft 202 can work in its intended manner, even when placed at an angle. In one embodiment, it is envisioned that it is possible to drive the wheels at an angle so as to angle the conveyor belt. If the wheels are placed at an angle, the drive shaft 202 can still function in its intended manner because of the crown shape of the connector plug 256.

Figure 20:
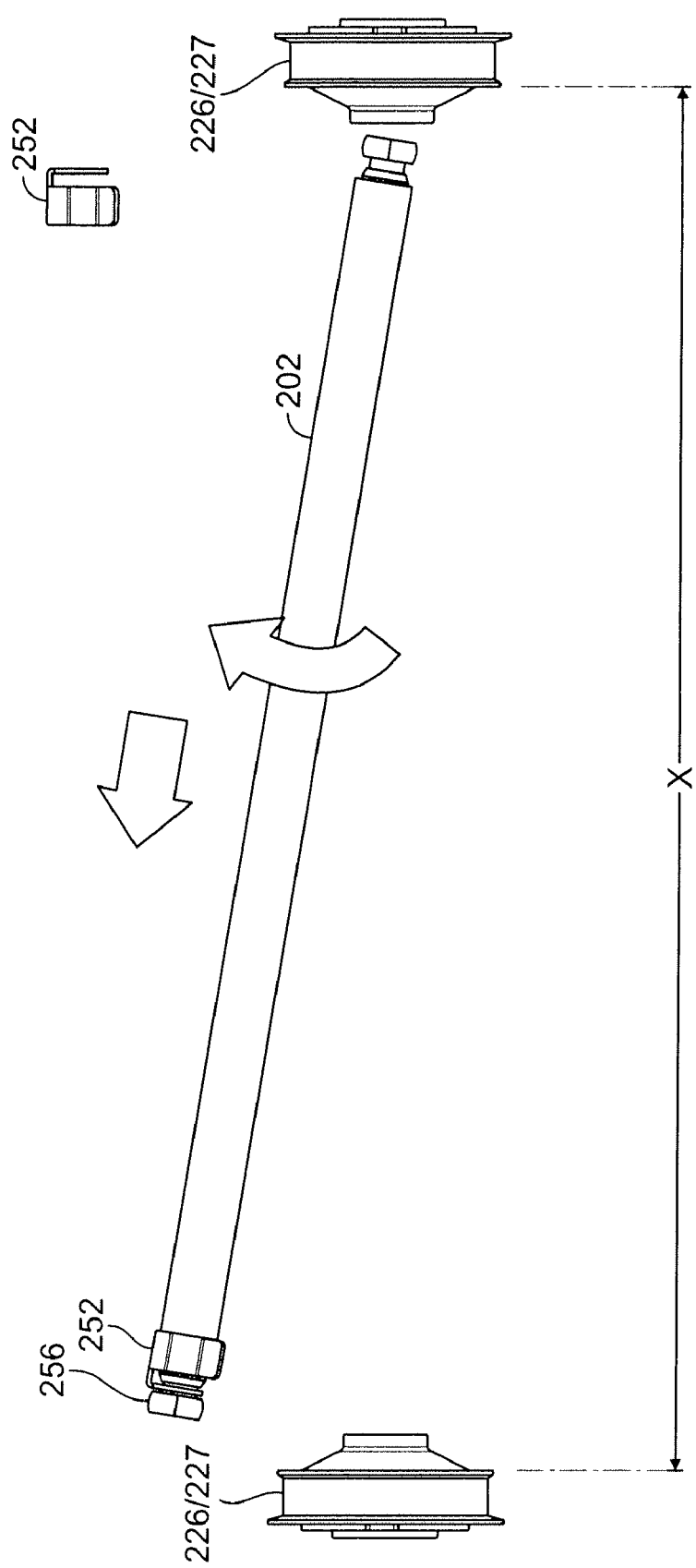
FIG. 20 illustrates a drive shaft rotated up and away from the rightmost wheel.

Again, the connector plug 256 does not have to be hexagonal in shape and can take on any other shape, so long as it can drive relative to a surface within the wheel 226/227. FIG. 20 illustrates the drive shaft rotated up and then away from the rightmost wheel so as to pull the connector plug out of the rightmost wheel.

Thus, the drive shaft allows for very quick and easy assembly/disassembly, without the need of any tools and without the need to displace/remove any other parts from the assembly in order to connect/disconnect the shaft. The drive shaft does not include moveable parts, has a low cost design.

Still further, there may be many other plug and tube shapes used to transfer torque, keeping the thrust of the invention, to use a crowned torque transferring shape in combination with hand-removable retaining clips. For example, the plug shapes may include, but are not limited to two-, three-, four-, pentagonal shapes, etc. Still other shapes could be TORX-look-a-like crowned profiles, other shapes that uses a different number embedded spherical bodies (balls), and can transfer torque to a mated corresponding female parts, etc. The torque tube (drive shaft 202) may also be not round in section. Other shapes may also work, such as square tubes, three sided tubes, solid tubes, etc.

As previously discussed, the conveyors can include integrated networked communications. These communications allow individual conveyor segments to be controlled by a computer system via a network. The computer system can also execute software that allows individual FOUPs to be transported and tracked stopped at load ports, stackers, or while on the conveyors.

The invention may be practiced with other computer system configurations including computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these 25 operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

The invention claimed is:

1. A conveyor system comprising:
   a conveyor configured to transport a container, the conveyor comprising:
      a first cartridge module comprising:
         a plurality of wheels configured to hold a conveyor belt for transport of the container;
      a second cartridge module;
      a drive motor configured to provide power to at least one of the plurality of wheels; and
      a releasable drive shaft configured (i) to connect between the first cartridge module and the second cartridge module, and (ii) to transfer the power from the at least one of the plurality of wheels of the first cartridge module to a wheel of the second cartridge module; wherein a clip is for sliding over the releasable drive shaft for placing an edge of the clip into a retaining clip groove.

2. The conveyor system of claim 1, wherein the second cartridge module is configured for removal from the conveyor.

3. The conveyor system of claim 1, wherein the cartridge plate is configured for removal from the conveyor.

4. The conveyor system of claim 1, wherein the conveyor comprises one or more integrated sensors configured to detect a presence of the container on the conveyor.

5. The conveyor system of claim 1, wherein the conveyor comprises one or more metal rails that are configured to transport the container.

6. The conveyor system of claim 1, wherein:
   the first cartridge module is further configured for removal from the conveyor following removal of the releasable drive shaft.

7. The conveyor system of claim 2, wherein:
   the second cartridge module is further configured for removal from the conveyor following removal of the releasable drive shaft.

8. The conveyor system of claim 1, further comprising:
   a computing device configured to establish communication between the first conveyor module and the second conveyor module.

9. The conveyor system of claim 1, wherein the first conveyor module is independent from the second conveyor module.

10. The conveyor system of claim 1, wherein the cartridge plate is configured to hold the drive motor.

11. The conveyor system of claim 1, further comprising:
    a plurality of idler wheels; and
    one or more bearing assemblies, wherein the plurality of idler wheels are configured to rotate about the one or more bearing assemblies when a force is applied to the plurality of idler wheels by the drive motor.

12. The conveyor system of claim 1, wherein the drive shaft comprises a quick-release drive shaft.

13. The conveyor system of claim 1, wherein the drive shaft comprises:
    a torque transfer tube;
    a first connector plug attached to a first end of the torque transfer tube; and
    a second connector plug attached to a second end of the torque transfer tube.

14. The conveyor system of claim 13, wherein:
    the first connector plug is configured to be inserted into a wheel in the plurality of wheels; and
    the second connector plug is configured to be inserted in a wheel in the second cartridge module.

15. The conveyor system of claim 1, wherein the releasable drive shaft is configured to be released from the conveyor by performing operations comprising:
    moving the releasable drive shaft in a first direction until the drive shaft is released from a wheel in the plurality of wheels in the first cartridge module; and
    rotating the releasable drive shaft in a second direction releasable until the drive shaft is released from a wheel in the second cartridge module.

16. The conveyor system of claim 1, wherein:
    the releasable drive shaft comprises a tube that is configured for insertion into a center of a wheel in the plurality of wheels.

17. A method comprising:
    providing power to a first cartridge module in a conveyor, the first cartridge module comprising:
       a plurality of wheels;
    transferring, by a releasable drive shaft, the power from the first cartridge module to a second cartridge module in the conveyor;
    moving the releasable drive shaft in a first, horizontal direction until the releasable drive shaft is released from a wheel in the plurality of wheels of the first cartridge module;
    rotating the releasable drive shaft in a second, vertical direction until the releasable drive shaft is released from a wheel in the second cartridge module;
    removing the releasable drive shaft from the conveyor; and
    removing the first cartridge module from the conveyor wherein a clip is for sliding over the releasable drive shaft for placing an edge of the clip into a retaining clip groove.

18. The method of claim 17, further comprising:
    replacing the first cartridge module with another cartridge module.

19. The method of claim 17, further comprising:
    inserting the releasable drive shaft into a wheel of the first conveyor module and a wheel of the second conveyor module.

* * * * *